Feb. 24, 1942.                G. DONINGTON ET AL            2,274,594
          APPARATUS FOR REMOVING IMPURITIES FROM INTERNAL
                    COMBUSTION ENGINE EXHAUST GASES
                      Filed Nov. 20, 1939          6 Sheets-Sheet 1
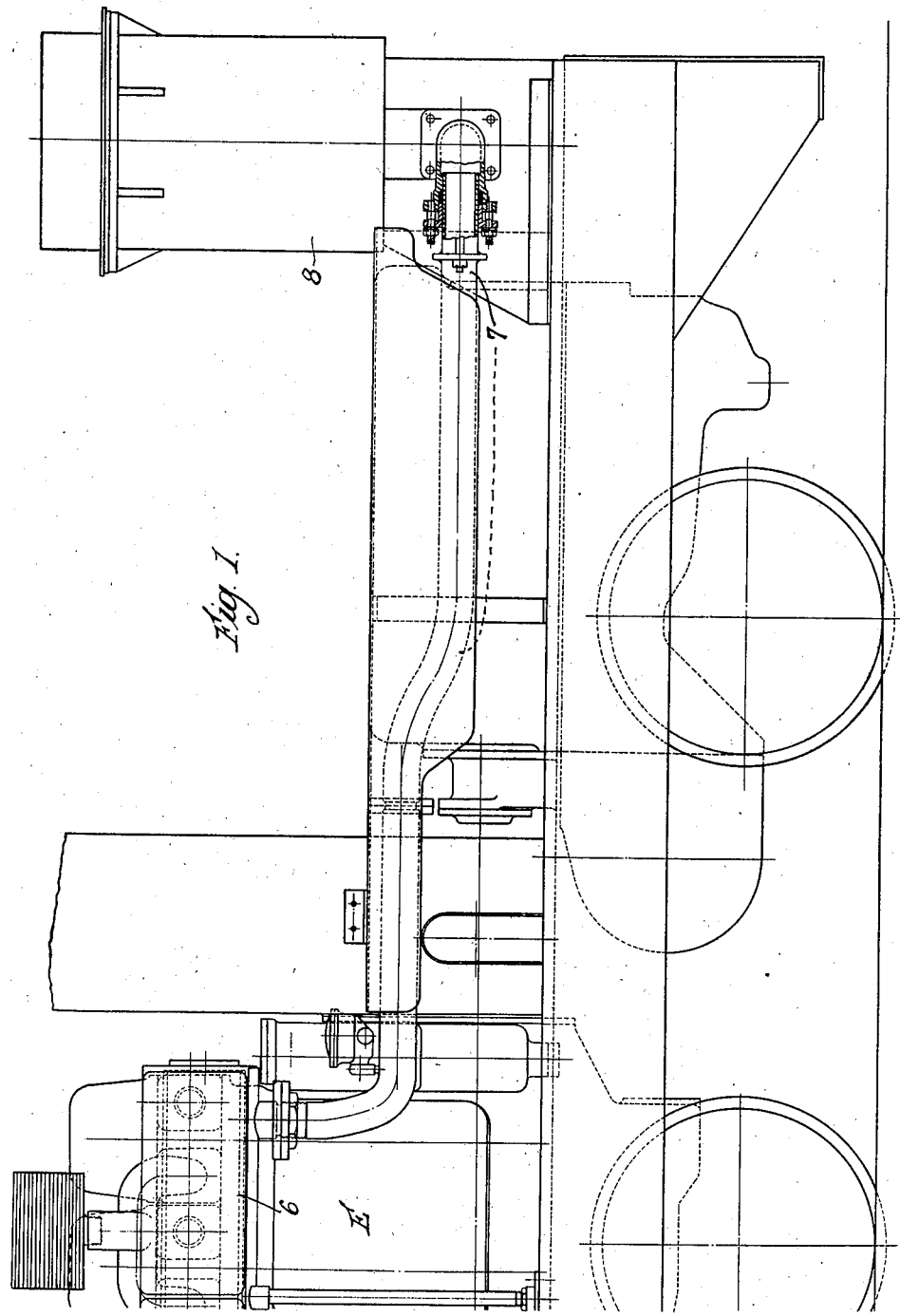

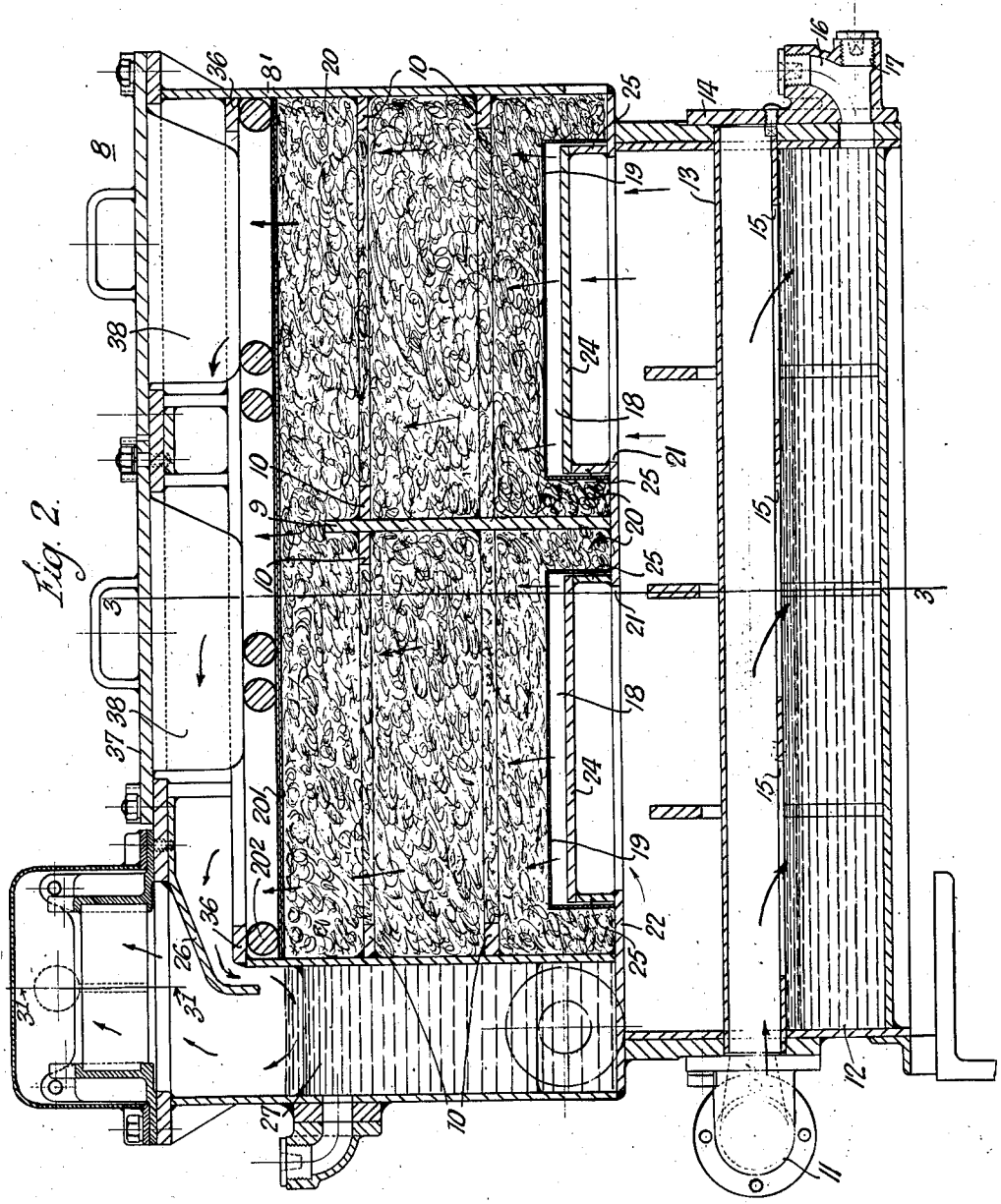

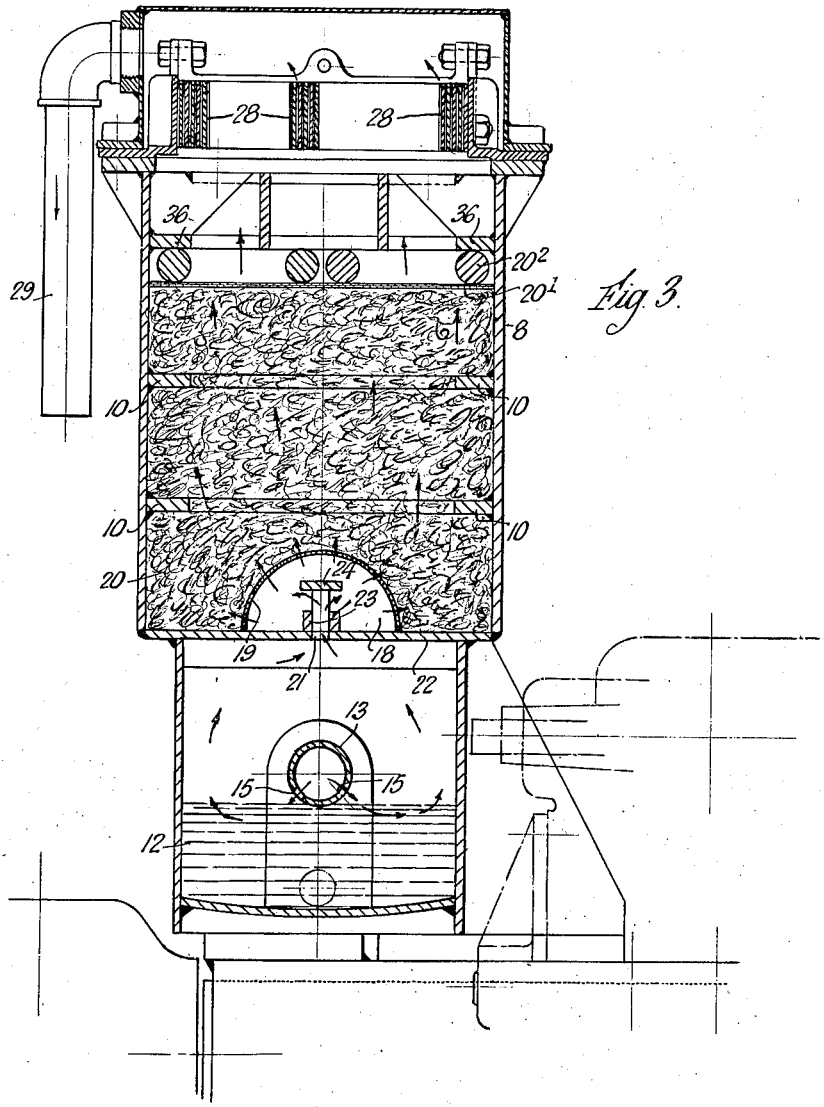

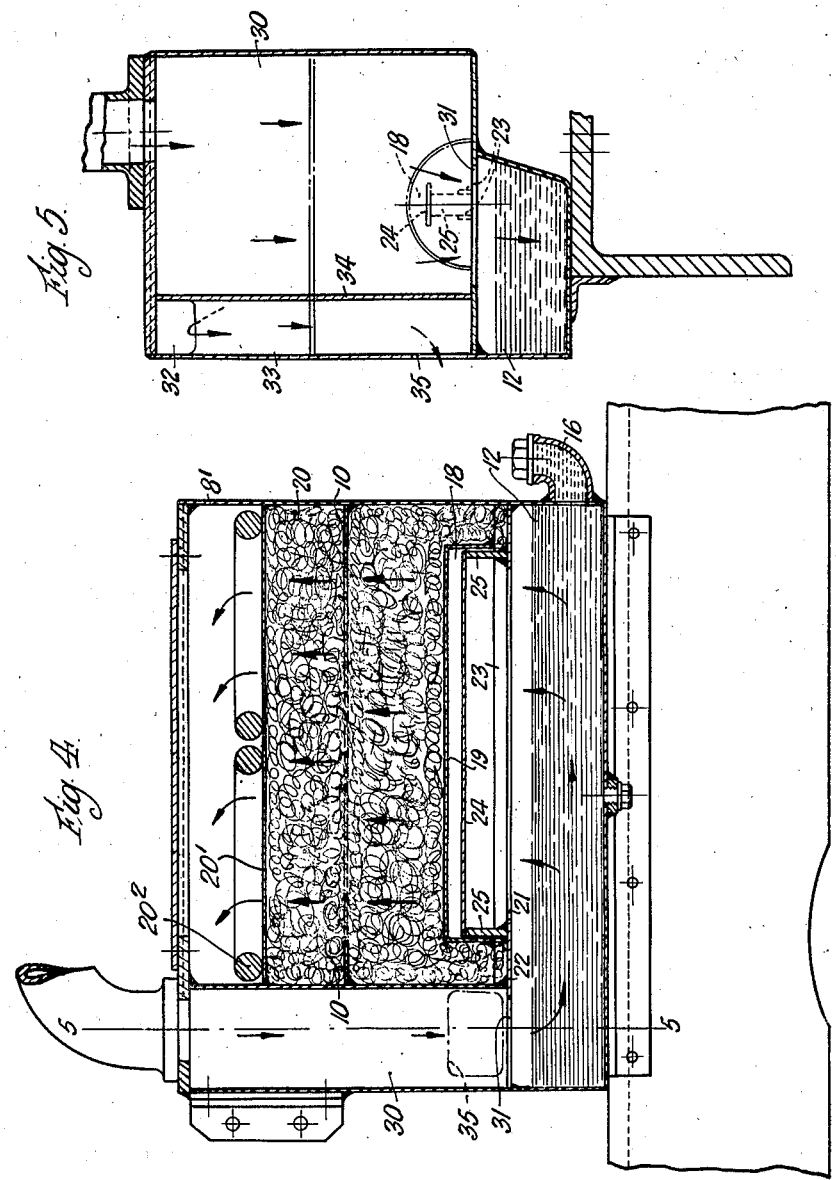

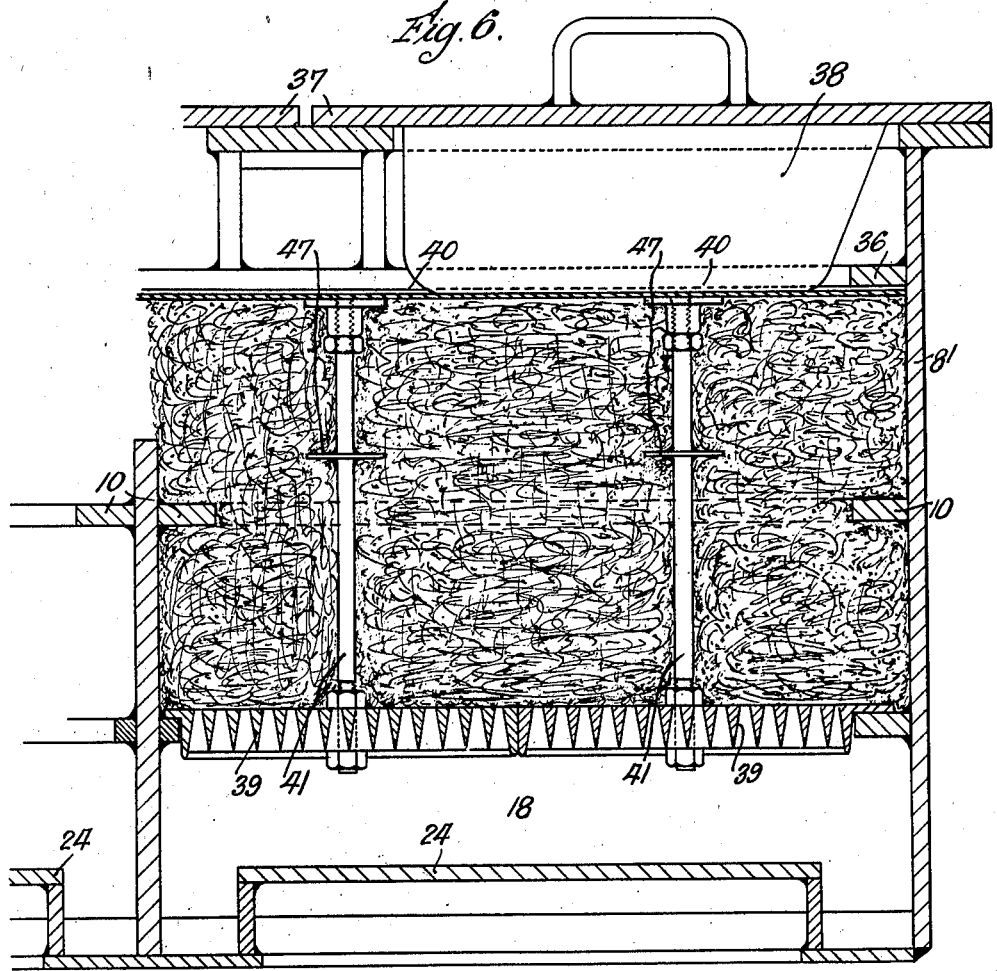

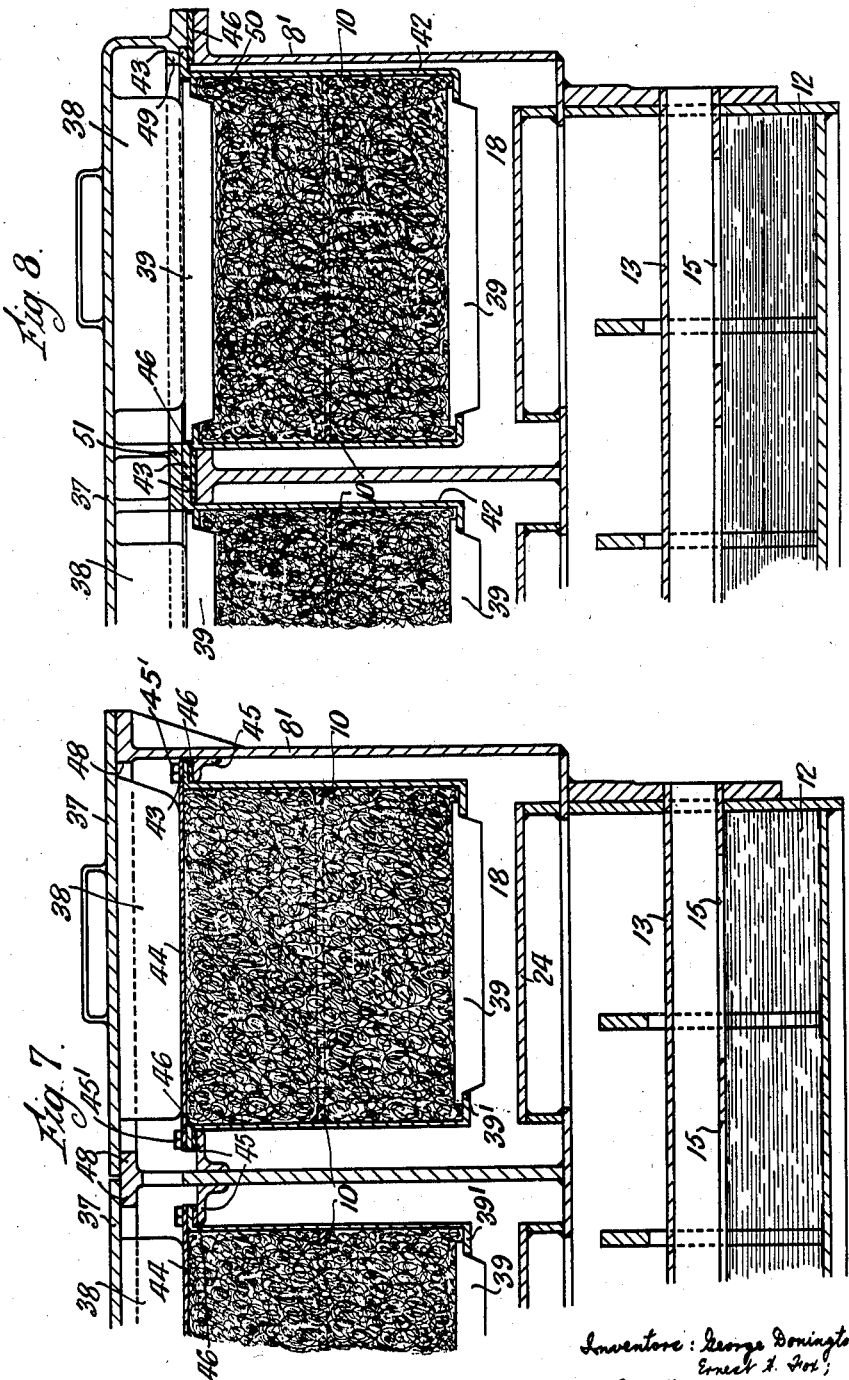

Patented Feb. 24, 1942

2,274,594

UNITED STATES PATENT OFFICE 2,274,594

APPARATUS FOR REMOVING IMPURITIES FROM INTERNAL COMBUSTION ENGINE EXHAUST GASES

George Donington and Ernest Henry Fox, Lincoln, England, assignors to Ruston & Hornsby Ltd., Lincoln, England Application November 20, 1939, Serial No. 305,408
In Great Britain March 1, 1938

4 Claims. (Cl. 183—15)

This invention relates to apparatus for filtering exhaust gases from internal combustion engines, more particularly heavy oil engines and especially those used for driving locomotives adapted to operate in confined spaces as in underground mines and similar workings where it would be highly objectionable and injurious to discharge exhaust gases in an unpurified condition. The invention is concerned with filters in which a filter chamber is filled or packed with a suitable moisture absorbing filtering medium or media such as wood sawdust or slag wool and wherein the continuity of the interior surfaces of the side walls of the filter chamber is interrupted in the general direction of the flow of the exhaust gases through the filtering medium or media therein, means being provided for subjecting the filtering medium or media to compression.

The present invention provides improved filtering apparatus which will permit water to be supplied to the filtering medium or media more regularly and evenly and ensure the latter being maintained in a sufficiently moist condition automatically throughout the working of the engine with which it is used, without over saturation, and where a burnable filtering medium or media is or are employed, obviate burning thereof.

This is achieved by conducting the hot exhaust gases from the engine directly into a water chamber or chambers of the filtering apparatus or firstly through an expansion or distributing chamber or chambers thereof in such a manner that the gases impinge upon the surface of the water in said water chamber or chambers after which they pass or are conducted into the filter box proper, whereby the water taken up by the hot exhaust gases will maintain the filtering medium or media continuously in a moist condition.

Preferably the exhaust gases from the engine are passed through any usual form of air or water cooled exhaust box, expansion chamber or manifold before being conducted to or entering the filtering apparatus.

Upon entering the filtering apparatus the exhaust gases are led preferably directly into the water chamber or chambers above the level of the water therein, through a pipe, pipes, conduit or conduits suitably arranged and mounted therein and having an opening, openings or perforations on the lower side in order that the exhaust gases may impinge upon the surface of the water in the water chamber or chambers and thereby absorb an amount of water vapour which is subsequently condensed upon the filtering medium or media in the filter box to maintain it constantly in a moist condition.

The filter box proper may be filled or packed with any suitable filtering medium or media such as wood sawdust or slag wool and with a water chamber, the chamber being provided with a pipe or conduit having one end closed and the lower side provided with one or more slots extending more or less throughout its length or provided with any suitable number and arrangement of much shorter slots or other openings or with perforations.

Where it is desired or more convenient to lead the exhaust gases into the upper part of the filtering apparatus, they are conducted to a vertical expansion or distributing chamber or chambers built into, on or around the filter box proper and communicating with the water chamber or chambers disposed below the filter box proper, at one or more places through a suitable opening or openings or perforations.

Near or adjacent the outlet for the exhaust gases from the filtering apparatus, a baffle or deflecting plate is fitted to direct any solid matter that may be taken up from the filtering medium or media with the exhaust gases, into water contained in a collecting chamber and thus hold it in suspension in the water, said baffle or deflecting plate also serving to condense any water vapour in the gases as they pass over it and conduct the condensate into the collecting chamber.

The outlet for the gases from the filtering apparatus to atmosphere may be provided with flame trap grids, either as a permanent fitting or for attachment when the filtering apparatus is to be used in locations where the release of any sparks or flame into the atmosphere is forbidden.

Referring now to the accompanying drawings which illustrate two forms of the filtering apparatus according to the present invention designed for locomotives driven by high compression oil engines—

Figure 1 is a side elevation of a locomotive showing the arrangement of the filtering apparatus and the oil engine and the manner in which the exhaust box of the latter is connected with the filtering apparatus.

Figure 2 is a sectional elevation of one form of the improved filtering apparatus.

Figure 3 is a cross sectional elevation of the filtering apparatus shown in Figure 2 partly on the line 3—3 and partly on the line $3^1$—$3^1$ thereof.

Figure 4 is a similar view to Figure 2 of a modified form of filtering apparatus, whilst Figure 5 is a cross sectional elevation of the filtering apparatus shown in Figure 4, on the line 5—5 thereof.

Figures 6, 7 and 8 are sectional views of further modifications.

In carrying out the present invention as illustrated in Figures 1 to 3, the exhaust gases from the four cylinder engine indicated at E in Figure 1 are conducted into an exhaust box or manifold 6 from which they pass through an exhaust pipe 7 into the filtering apparatus denoted generally by the reference 8. The exhaust box is, in the application illustrated, water cooled as usual.

The filter box illustrated in Figures 2 and 3 is constructed generally from stout plate 8' and is provided with a transverse reinforcing partition 9 approximately midway of its length, whilst upper and lower internal baffles are formed by ribs 10 welded to the side plates 8' and to the partition 9. This construction of filter box is especially suitable for use in mines where explosive mixtures are liable to be encountered. A single rectangular water chamber 12 is provided below the filter box proper 8, the chamber 12 being of slightly less width and length than the filter box proper and welded to it as illustrated. Both the filter box proper 8 and the water chamber 12 together form a unit which is suitably mounted and supported upon the frame of the locomotive as illustrated in Figure 1. A gas distributing pipe 13 is supported within the water chamber 12 midway of its depth as illustrated or in the upper part thereof or a short distance above said mid-position and extends throughout the length thereof. One end of the pipe 13 extends through one end wall of the water chamber 12 and this end is closed by a cover plate 14. The other end of the distributing pipe 13 is mounted in the opposite end wall of the water chamber 12 where it is connected with the exhaust pipe 7 from the engine at 11. The distributing pipe 13 is provided in its under side with ports or slots 15 which extend along the pipe at either side of a vertical plane passing through its axis, as is clearly shown in Figure 3. Water is supplied to the water chamber 12 through an elbow 16, this elbow also serving for draining the water chamber through the hole which is normally closed by a screwed plug 17. The chamber 12 is filled initially to a maximum height so that the surface of the water lies at the level of the under side of the gas distributing pipe 13 or a short distance below that level. Although with the apparatus described above, the replenishing of the water in the water chamber will be necessitated from time to time, it will not be required at such frequent intervals as would be the case if the filtering medium were directly saturated by pouring water upon it.

Communication between the water chamber 12 and the filter box proper 8 may be effected through a number of openings leading from the former into a gas distributing chamber disposed in the bottom of the filter box proper. It is, however, preferred to provide, as shown in the drawing, two aligning gas distributing chambers 18, 18, which may be of substantially semi-circular cross section (see Figure 3) extending longitudinally over almost the whole length of the filter box and formed preferably by brass gauze 19. The filtering medium 20 completely surrounds the walls of these two distributing chambers so that they are separated from one another and from the side walls 8' and also the dividing or partition wall 9 of the filter box itself by the filtering medium. Communication between each of said gas distributing chambers and the water chamber 12 is effected through a slot 21 extending throughout substantially the whole length of the chamber 18 in the dividing wall 22. For the more effective distribution of the gases, a wall 23 is provided on either side of each slot 21 to form a channel (see Figure 3) for directing the gases upwardly, whilst a horizontal baffle plate 24 is mounted towards the top of each gas distributing chamber to direct the gases laterally into the filter box proper. The said directing channels may be formed by bars extending throughout the length of each distributing chamber and welded in position whilst the horizontal baffle plate 24 may be welded to vertical end pieces or plates 25 preferably welded to the dividing wall 22 between the gas distributing chambers 18, 18, and the water chamber 12.

With the foregoing construction it will be observed that the exhaust gases passing into the gas distributing pipe 13 will impinge upon the surface of the water in the water chamber throughout practically the whole of the length of that chamber so that thorough saturation occurs of the exhaust gases with water vapour, the saturated gases then passing to the filtering medium which is consequently maintained in a moist condition by the water vapour. It will be appreciated that, by the invention, the filtering medium is supplied with moisture automatically at a rate governed by the demand made upon it by the flow of gas requiring to be filtered. This avoids any difficulties which might arise if moisture were poured at intervals by hand on the medium or if a regulated flow of water were supplied to the medium: in either case it would be difficult to supply just the requisite quantity of water and moreover there may be times when the engine is running idle for long periods so that if the supply of water is not then controlled to suit or is not shut off, a large quantity of water might accumulate in the filtering apparatus and some of it would enter the engine exhaust pipe and may eventually find its way into the engine cylinder with possible serious consequences.

Furthermore, under those conditions, water may be blown through the exit for the exhaust gases to atmosphere when the engine is put under load and that action would be liable to affect the working of the filter adversely.

If on the other hand, insufficient moisture were supplied the medium might become so dry that it would commence to burn, so that the functioning of the apparatus would be impaired. These difficulties are avoided by utilising the exhaust gases themselves to pick up water vapour which in turn maintains the medium in the moist condition. The upper part of the water chamber 12 above the gas distributing pipe serves as an expansion chamber for the exhaust gases before they enter the filter box proper. It will be appreciated that, as the gases pass through the cooled exhaust box 6 the rate of water evaporation in the chamber 12 is lessened and in addition the flow of the gases is rendered more even in passing to the filtering medium.

The filtering medium 20 in the filter box proper may comprise wood sawdust or any other suitable moisture absorbing or retaining filtering medium or media. Where the filtering apparatus is required to operate under conditions which forbid the release of sparks or flame into the atmosphere, a non-inflammable filtering medium or media such as slag wool may be used.

The gases having passed through the filtering medium pass out through a perforated cover which may be of stiff gauze indicated at 20'.

In order to maintain the filtering medium in position against the pressure of the exhaust gases, horizontal ribs 36 arranged above the medium are welded to the sides 8' of the filter box and a cover plate 37 for the box is provided with downwardly extending ribs 38, these parts reacting against the covering 20' through weights 20² of circular cross section placed thereon to maintain the medium 20 under compression, these weights being (as shown in Figures 2 and 3) arranged in rows lengthwise and crosswise. The ribs 10 prevent the exhaust gases from forming cavities in the filtering medium 20, the ribs being disposed at the smooth sides of the filter where the tendency for the medium to cavitate is most marked, it being noted that the ribs 10 break the continuity of the smooth sides of the filter box in the general direction of the flow of the exhaust gases through the box.

A baffle or deflecting plate 26 is provided near the outlet with its lower end passing into a collecting chamber 27 which is filled with water. This baffle plate serves to direct any solid matter, taken up from the filtering medium or media with the exhaust gases, into the water in this collecting chamber and is thus held in suspension therein. Any water vapour coming into contact with the baffle or deflecting plate 26 is condensed thereon and the condensate falls into the collecting chamber.

Furthermore the outlet for the gases from the filtering apparatus to atmosphere is formed so that flame trap grids 28 may be fitted thereto either as a permanent fitting or for attachment when the filtering apparatus is required to operate under conditions which, owing to the presence of explosive gases, forbid the release into the atmosphere of any spark or flame. The gases after passing through the flame trap grids 28 are led away through an outlet pipe 29.

Reference will now be made to the modified form of the filtering apparatus illustrated in Figures 4 and 5 in which parts similar to those described with reference to Figures 2 and 3 are designated by similar numerals. This modified form is not constructed so robustly as the form previously described herein and the exhaust gases from the engine after passing through the air or water cooled exhaust box or manifold 6 are conducted directly into the upper part of the filtering apparatus 8. To permit the gases to impinge upon the water in the water chamber 12 below the filter box proper the latter is made of shorter length than the water chamber 12 below it and above the overlapping portion of the latter a vertical gas distributing chamber 30 of rectangular cross section is provided. This chamber has one end wall formed by the end wall of the filter box proper and the side walls formed by extending the sides of the filter box proper, so that the chamber 30 is built into and forms an integral part of the filtering apparatus. The bottom of the distributing chamber 30, which is constituted by the dividing wall between it and the water chamber 12, is cut away as shown at 31 so as to be freely open to the water chamber 12.

The filter box proper is constructed in this form of the invention with a single gas distributing chamber 18 provided between the water chamber 12 and the filter box proper.

In this modified arrangement, the exhaust gases emerging from the end distributing chamber 30 will impinge upon the surface of the water immediately below at one end of the water chamber 12 so that the gases will have to pass through the water and over the surface thereof before entering the filter box proper above it through a suitable opening 21 leading into the gas distributing chamber 18 in a similar manner to that described above in connection with the form of the present invention illustrated in Figures 2 and 3. After emerging from the filtering medium or media 20 at the top of the filter box, the exhaust gases pass through an opening 32 leading into the top of a comparatively narrow exhaust outlet chamber 33 formed by a partition 34 in the chamber 30. The gases finally pass out of the apparatus through the opening 35.

In this case also, the weights 20² are alone relied upon to maintain the filtering medium 20 in position, the weights resting on the perforated cover 20' which may be of stiff gauze.

In this form of the invention also any suitable moisture absorbing or retaining filtering medium or media such as wood sawdust or slag wool may be used.

Referring now to the modification illustrated in Figure 6, instead of forming the distributing chambers 18 by brass gauze 19 shaped into semi-cylindrical form, the space below the lower internal ribs 10 is employed as an expansion chamber by providing stout grids 39 mounted on the lower ribs 10 shown in the construction of Figures 2 and 3. The grids are held firmly in position by stay bolts 41 fastened to the grids and bearing against the gauze at the top of the filtering medium through flanged heads 40 screwed on to the bolts 41. Some of the bolts 41 are disposed directly under the ribs 38 extending downwardly from the cover plates 37 and bearing against the gauze at the top of the filtering medium, whilst the remaining bolts 41 bear on the said gauze close to the ends of the ribs 38 as seen towards the left of Figure 6.

It will thus be understood that the top gauze is held against upward movement by the ribs 36 and 38 whilst the grids 39 are held firmly on the lower ribs 10 through the bolts 41 and ribs 38 on the cover plates, so that the mass of filtering medium will be held firmly within the filter box against vibrations that may be imparted to it. In order to prevent cavitation, annular baffles 47 are welded around the bolts 41.

The filtering medium may be disposed in one or more containers adapted to be removably secured within the filter box so that the filtering medium may be readily removed from time to time for cleaning. Where more than one removable container is provided, the filter box is fitted with transverse partitions having a removable container on each side thereof. Such an arrangement is illustrated in Figure 7 which shows the use of two removable containers. Each container comprises a rectangular box 42 having its base formed by grids 39 mounted upon or secured to inwardly directed flanges 39' formed at the bottom of the container.

The interior of each container is provided with ribs 10, these ribs replacing the ribs 10 on the side walls of the filter box proper as in the previously described constructions.

The top of each container 42 is flanged externally at 43 and is covered with brass gauze 44. Each container is secured in position on angle irons 45 by bolts or studs 45' passed therethrough and also through the flanges 43, the gauze cover 44 and gaskets 46 being interposed between the angle irons 45 and the flanges 43. The top of the filter box is provided with rectangular openings 48 large enough to permit the flanges 43 on the containers to pass through the openings when the containers are being withdrawn from the filter box; the openings 48 are fitted with cover plates 37 having ribs 38 which bear upon the gauze 44 covering the tops of the containers.

It will be seen that with this construction, spaces are formed between the side walls of each container 42 and the adjacent side walls 8' of the filter box proper and the central dividing wall or partition 9 therein as well as between the bottom of each container 42 and the bottom of the filter box proper. These spaces form expansion chambers to produce a more steady flow of the exhaust gases entering the filtering medium.

In the arrangement illustrated in Figure 8 which is a modification of the construction illustrated in Figure 7, the cover of the filter box is hollow and the containers 42 are secured in position by internal flanges 49 and a transverse facing strip 51 on the cover, bearing upon the flanges 43 of the containers when the cover 37 is secured in position. The filtering material is held in position between upper and lower grids 39 supported upon internal flanges 50 on the containers. Longitudinal ribs 38 on the cover bear against the upper grids 39 and thus hold the filtering material firmly in position in the containers.

What we claim is:

1. In apparatus for removing impurities from the exhaust gases of an internal combustion engine to which the apparatus is attached, the apparatus comprising a horizontally disposed chamber to contain water, a filter box having a bottom wall member disposed horizontally over said chamber, an upstanding partition member in said box, said box having inlet means in its bottom wall on opposite sides of the partition wall member, a removable container in the filter box on each side of the partition wall member suspended from the partition wall member and other parts of the box, said containers being disposed above said inlet means and open to the passage of gas therethrough, absorbent filtering material in said containers, a conduit constructed and arranged to discharge the exhaust gases from the internal combustion engine into contact with the water in said chamber to entrain water in such quantity and division as to condense on the filtering material to alone automatically maintain the moisture content of the filtering material approximately even, and a cover member disposed over the box, one of said members being formed to provide an opening to facilitate passage of gas from one side of the partition wall member to the other side in the discharge thereof.

2. Apparatus according to claim 1 having engaged flanges on the containers, partition and parts, and wherein said conduit extends longitudinally of the chamber and has outlets located to discharge the gas downwardly.

3. In apparatus for removing impurities from the exhaust gases of an internal combustion engine to which the apparatus is attached, the apparatus comprising a horizontally disposed chamber to contain water, a filter box having a bottom wall disposed horizontally over said chamber, an upstanding partition member in said box, said box having inlet means in its bottom wall on opposite sides of the partition, a removable container in the filter box on each side of the partition having outwardly extending flanges overlapping the upper edge of the box including the partition, said containers being disposed above said inlet means and open to the passage of gas therethrough, absorbent filtering material in said containers, a conduit constructed and arranged to discharge the exhaust gases from the internal combustion engine into contact with the water in said chamber to entrain water in such quantity and division as to condense on the filtering material to alone maintain the moisture content of the filtering material approximately even, and a cover disposed over said box, said cover being hollow for passage of gas from one side of the partition member to the other side in the discharge thereof.

4. Apparatus according to claim 1 having screening means at the top and bottom of each container, depending ribs on the cover, and said conduit being longitudinally disposed in said chamber.

GEORGE DONINGTON.
ERNEST HENRY FOX.